(12) United States Patent
Kimura et al.

(10) Patent No.: US 7,008,572 B2
(45) Date of Patent: Mar. 7, 2006

(54) METHOD OF PRODUCING POLYMER SPHERICAL BODIES

(75) Inventors: Tsunehisa Kimura, Tokyo (JP); Masafumi Yamato, Tokyo (JP); Haruka Nakazawa, Tokyo (JP)

(73) Assignee: Japan Society for the Promotion of Science, Tokyo (JP)

( * ) Notice: Subject to any disclaimer, the term of this patent is extended or adjusted under 35 U.S.C. 154(b) by 280 days.

(21) Appl. No.: 10/467,294

(22) PCT Filed: Feb. 7, 2002

(86) PCT No.: PCT/JP02/01034

§ 371 (c)(1),
(2), (4) Date: Aug. 7, 2003

(87) PCT Pub. No.: WO02/062853

PCT Pub. Date: Aug. 15, 2002

(65) Prior Publication Data

US 2004/0070095 A1 Apr. 15, 2004

(30) Foreign Application Priority Data

Feb. 7, 2001 (JP) ............................. 2001-031533

(51) Int. Cl.
*B29B 9/00* (2006.01)
(52) U.S. Cl. ........................................ 264/10; 264/494
(58) Field of Classification Search ................. 264/1.1, 264/1.36, 1.38, 5, 10, 15, 405, 494; 425/6, 425/174.4
See application file for complete search history.

(56) References Cited

FOREIGN PATENT DOCUMENTS

JP 1-213303 A 8/1989
JP 9-227610 A 9/1997

OTHER PUBLICATIONS

Yasuhiro Ikezoe et al., "Making Water Levitate", *Nature*, 1998, p. 749-750, vol. 393.
Naoyuki Kitamura et al., "Containerless Melting of Glass by Magnetic Levitation Method", Japan Journal Applied Physics, 2000, p. L324-L326, vol. 39, Part 2, No. 4A, Japan Society of Applied Physics.

*Primary Examiner*—Mathieu D. Vargot
(74) *Attorney, Agent, or Firm*—Buchanan Ingersoll PC

(57) ABSTRACT

This invention relates to a method of producing polymer spherical bodies and is to produce a large size spherical body having no residual strain. This method comprises suspending a liquid monomer in a supporting liquid having a magnetic susceptibility $\chi_2$ larger than a magnetic susceptibility $\chi_1$ of any one of the monomer and the resulting polymer and not dissolving substantially the monomer, and applying a gradient magnetic field to the supporting liquid to float droplets of the monomer at a given position in the supporting liquid, and polymerizing and solidifying the droplets while maintaining a state that the droplet is substantially shaped into a sphere through surface tension. This method is made possible to produce polymer spherical bodies capable of using in optical application and the like.

24 Claims, 5 Drawing Sheets

METHOD OF PRODUCING POLYMER SPHERICAL BODIES

TECHNICAL FIELD

This invention relates to a method of producing a polymer spherical body, particularly a polymer true-sphere using a magneto-Archimedes effect. The polymer true-sphere, particularly transparent polymer true-sphere is applied to an optical lens by itself or by continuously changing a refractive index of a surface of the true-sphere through a chemical change (graded index lens or the like).

BACKGROUND ART

Heretofore, the polymer true-sphere has been produced by a method of polishing a solid material, or by a method of pouring a melt into a mold to conduct solidification, or by a suspension polymerization method. Also, a method of producing a glass true-sphere by using a magnetic field is used. In the latter method, the true-spheres are produced by magnetically floating diamagnetic inorganic glass with a magnetic field of not less than 20 T, melting it through a laser beam, shaping into a sphere through surface tension and then cooling.

In the production method of the polymer true-sphere by polishing the solid material or by utilizing the mold, the size of producible sphere is not limited, but there are caused a problem of true-sphere accuracy, and a problem of residual strain by compression stress and solidification stress, so that the resulting spheres are not suitable for optical use. And also, the suspension polymerization method has drawbacks that the size of the producible sphere is less than 2 mm at maximum and the control of the size is difficult, or deformation is caused during the agitation. In the method wherein the glass magnetically floated in air is melted through the laser beam and shaped into spheres through surface tension, it is required to use a strong magnetic field (about 20 T) for floating. Although the magnetic floating is enabled at a relatively weak magnetic field by using a pressurized oxygen gas, since the heating and melting are carried out in the oxygen gas, if the floated body is particularly an organic substance such as polymers or the like, there is a possibility that the organic substance is decomposed or burnt.

DISCLOSURE OF THE INVENTION

In order to solve the above problems, there is invented a method wherein droplets of a monomer are floated through a magneto-Archimedes process and shaped into spheres through surface tension and then polymerized and solidified at such a state.

The method of producing a polymer spherical body according to the invention lies in that a liquid monomer is suspended in a supporting liquid having a magnetic susceptibility $\chi_2$ larger than a magnetic susceptibility $\chi_1$ of any one of the liquid monomer, monomer in the course of the polymerization, the resulting polymer and polymer mixture and not dissolving substantially the monomer, and a gradient magnetic field is applied to the supporting liquid to float droplets of the monomer at a given position in the supporting liquid, and the droplets are polymerized and solidified while maintaining a state that the droplet is substantially shaped into a sphere through surface tension.

The invention has the following features. That is, (1) stable floating is possible owing to the use of diamagnetic levitation; (2) since the body to be floated prior to the polymerization (monomer) is liquid, it can be automatically shaped into a sphere through surface tension; and (3) droplets of the monomer are floated at a given position in the supporting liquid by applying the gradient magnetic field to the supporting liquid, in which it is possible to always float the droplets at the given position by controlling the gradient of the magnetic field to adjust floating conditions changed in the course of the polymerization. Moreover, the wording "the liquid monomer, monomer in the course of the polymerization, the resulting polymer and polymer mixture" means to include all state of changing from droplets of the monomer through droplets of partially polymerized monomer to polymer during the polymerization of the monomer droplet.

The diamagnetic levitation has the following features: (1) stable magnetic floating of paramagnetic and ferromagnetic substances is impossible according to theorem of Earnshaw, but stable floating is possible for diamagnetic substances; and (2) since the magneto-Archimedes effect is used, the diamagnetic levitation is possible at a relatively weak magnetic field. In the invention, a liquid is particularly used as a floating medium in the magneto-Archimedes effect, so that the floating is possible at a weaker magnetic field and also the decomposition or the like of the polymer as a body to be floated does not occur as compared with the magneto-Archimedes process using a burning-susceptible pressurized oxygen gas as a floating medium.

The magneto-Archimedes effect has already been reported in an article (Y. Ikezoe et al., Nature, vol. 393, page 749, 1998), a schema of which is described below. An energy of a material body having a density $\rho_1$ and a magnetic susceptibility $\chi_1$ in a medium having a density $\rho_2$ and a magnetic susceptibility $\chi_2$ is shown by the following equation:

$$E = \Delta\rho g z - \frac{\Delta\chi B^2}{2\mu_0} \tag{1}$$

In this case, B is a magnetic flux density of an external magnetic field at a place of the material body, g is gravitational acceleration, $\mu_0$ is a vacuum permeability, $\Delta\rho=\rho_1-\rho_2$, $\Delta\chi=\chi_1-\chi_2$, and z is a vertical position coordinate based on a cent of the magnetic field z=0, in which upper and lower of z=0 in a vertical direction are represented by "+" and "−", respectively. In this case, when $\chi_1<0$ and $\chi_2>0$, $\Delta\chi<0$.

In general, the supporting liquid is not required to be always a paramagnetism, and may be a diamagnetic liquid having a value $\chi_2$ larger than a diamagnetism magnetic susceptibility $\chi_1$ of the body to be floated (monomer, monomer in the course of the polymerization, the resulting polymer and polymer mixture)($\chi_1<\chi_2$). In this case, the body to be floated is relatively diamagnetic to the floating medium and dose not violate the theorem of Earnshaw.

In FIG. 1 is shown the energy as a function of z in case that $\Delta\rho$ is positive or negative. As seen from FIG. 1b, in case of $\Delta\rho<0$ or when the density of the medium is larger than the density of the monomer, a minimum value of the energy appears in z<0. In case of $\Delta\rho>0$ or when the density of the medium is smaller than the density of the monomer, the minimum value of the energy appears in z>0 (In FIG. 1a are used numerical values of the following examples, so that minimum value is not seen at an initial polymerization stage, but it is possible to obtain a minimum value by using the other combination of $\Delta\rho$ and $\Delta\chi$). Either of the above minimum values can be used. The body floats in such a minimum value. In case of the magnetic field in an interior of a vertically placed solenoid, minimum value appears in not only a vertical direction (z-direction) but also a horizontal direction. Therefore, a three-dimensionally stable floating-position exists. The floating position z can be controlled by changing a distribution of magnetic field intensity.

Moreover, if the droplets are simply floated in the supporting liquid, it is not required to apply the gradient of the magnetic field. That is, the floating is made possible by making the density of the supporting liquid equal to that of the droplet. However, the balancing between gravity and buoyancy is not the balancing accompanied with a restoring force. Therefore, the position of the droplet is easily changed in the up-down and left-right directions by slight flowing or the like. On the contrary, when the magnetic field is used in addition to the gravity and buoyancy, the balancing field possessing not only the up-down directional restoring forces but also the left-right directional restoring forces can be formed by properly designing the distribution of the magnetic field. By such restoring forces can be retained the droplets in the supporting liquid at a given position with respect to the up-down directions without disturbance even if an external disturbance is a little. However, the given stable position changes with the progress of the polymerization, so that this position is made so as not to extremely move to the bottom of the vessel or the surface of the supporting liquid by adjusting the magnetic field intensity as mentioned above, whereby the object of the invention for the polymerization of the polymer true-sphere is attained.

The similar floating is made possible by using a magnetic fluid, but it is difficult to detect the floating position because this fluid is not transparent.

The constructional features of the invention are successively explained below. The production method of the spherical polymer solid according to the invention comprises the steps of (1) applying a gradient magnetic field to an aqueous solution of a paramagnetic inorganic salt as a supporting liquid; (2) pouring a monomer as a diamagnetic substance into the supporting liquid; (3) floating the monomer as substantially a spherical droplet through surface tension; (4) maintaining the substantially spherical monomer droplets in such a region that a sum of magnetic energy and dynamic energy becomes minimum with respect to a vertical direction and a horizontal direction; and (5) polymerizing the spherical droplets to produce spherical polymer solids.

(1) Supporting Liquid

As the supporting liquid, it is principally preferable to use a paramagnetic liquid not substantially dissolving a monomer component. From this point, an aqueous solution of a paramagnetic inorganic salt is preferable. For example, aqueous solutions of manganese chloride, manganese sulfate, iron chloride, iron sulfate, gadolinium chloride and the like are used.

As a concentration of the supporting liquid, it is preferable to use a paramagnetic inorganic salt having a large magnetic susceptibility in a low concentration from a viewpoint of the washing after the polymerization. From a viewpoint that the floating is carried out at a low magnetic field, it is preferable to use a paramagnetic inorganic salt having a large magnetic susceptibility in a high concentration. If it is possible to utilize a very strong magnetic field, more strictly a very large BdB/dz, the paramagnetic susceptibility of the supporting liquid may be small. That is, a paramagnetic inorganic salt having a small magnetic susceptibility can be used in a low concentration. From a viewpoint of the control of the floating position, it is preferable that the concentration is made higher to make $\chi_2$ large or make $|\Delta\chi|$ large. As seen from the equation (1), the minimum value of the energy is produced from right side, second term, so that as $|\Delta\chi|$ becomes large, the valley of the minimum value becomes deep and the stable floating is easy. As a result of increasing the concentration, the density $\rho_2$ is also large, so that the operation is carried out at $\Delta\rho<0$ or at a region of $z<0$.

Among the paramagnetic inorganic salts, the aqueous solution of manganese chloride exhibits a large paramagnetic susceptibility at a low concentration and is suitable as a supporting liquid. With respect to the performances of a magnet used in the example, the concentration is preferable to be a range of 1 wt % to 10 wt %. When the concentration is too low, the magnetic force is deficient and the monomer having a large density can not be floated even at a region of $z>0$, while when the concentration is too high, it is impossible to retain the monomer having a small density in the liquid even at a region of $z<0$. The concentration is properly adjusted in accordance with the gradient of the magnetic field or the like. Depending upon the density $\rho_2$ of the supporting liquid, the monomer having a density smaller than $\rho_2$ is polymerized while floating at a downward side from a center of a magnetic field, and the monomer having a density larger than $\rho_2$ is polymerized while floating at an upward side from the center of the magnetic field. Also, the production method according to the invention may be simultaneously applied to the monomer component floating at the downward side from the center of the magnetic field and the monomer component floating at the upward side from the center of the magnetic field.

(2) Monomer

As the monomer, water-insoluble organic substances having a vinyl bond such as methyl methacrylate, benzyl methacrylate, styrene and the like are applied to the invention. Also, a polymerization initiator such as a peroxide, an azo compound or the like is added to the monomer. The polymerization rate is proportional to square root of a concentration of the polymerization initiator, so that it is determined in conformity with control conditions such as reactivity of monomer, temperature and magnetic field intensity. A charging amount of the monomer is determined by the densities of the monomer and the resulting polymer rather than a size of a desired true-sphere after the formation.

(3) Magnetic Field

The magnetic field can be generated by a permanent magnet, an electromagnet or a super conductive magnet. In order to provide a minimum value of energy in both vertical and horizontal directions, however, it is preferable to use a magnetic field generated in an inside of a solenoid. In the other cases, the minimum value is frequently provided in either the vertical direction or the horizontal direction and hence the stable floating point can not be obtained. In order to control the distribution of the magnetic field, it is preferable to use the electromagnet or the super conductive magnet capable of continuously changing the current value. It is possible to control a magnetic field intensity based on an initial balancing position of a monomer droplet before the polymerization in such a manner that the position is optically monitored and detected in a given range of from upper limit to lower limit and a result outside the range is automatically fed back to a current controlling means.

(4) Polymerization Conditions

In the invention, a given charging amount of a monomer floating or settling in a liquid subjected to a gradient magnetic field is left to stand in the form of spherical droplets and polymerized without agitation. A polymerization through heat or a polymerization through light irradiation, which is not described in detail here, is principally applicable. Polymer true-spheres produced by the polymerization are recovered by, for example, a batch process or a continuous process. The polymerization rate is dependent upon the temperature, in which the higher the temperature, the faster the polymerization rate. However, as the rate becomes fast, there are caused problems such as adhesion of bubbles and the like, so that the temperature of from 60° C. to 80° C. is preferable though it is dependent upon the reactivity of the monomer. The concentration of the polymerization initiator exerts an influence on the polymerization rate. The concentration is desirable to be from 0.1 wt % to 1 wt % though it is dependent upon the reactivity of the monomer.

BEST MODE FOR CARRYING OUT THE INVENTION

The invention will be described in detail with reference to the following examples. These examples are given in illustration of the invention and are not intended as limitations thereof.

EXAMPLE 1

Case of floating at upward side from a center of magnetic field ($\Delta\rho>0$, z>0)

Figure 1A:
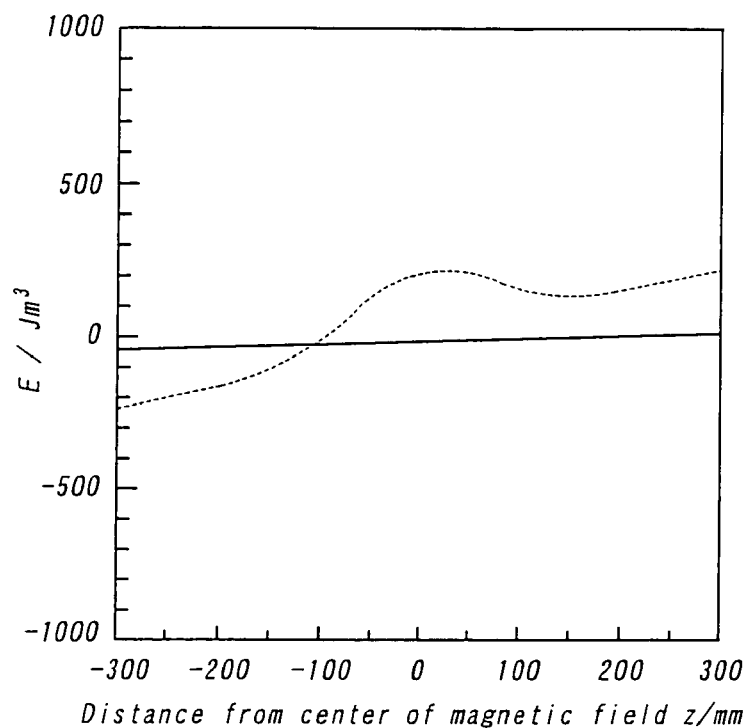
FIG. 1 is a graph plotting total energies (equation 1) in initial polymerization and last polymerization on z-coordinate in a vertical direction wherein B is a found value; when $\Delta\rho=0.01$ g/cm$^3$ and 0.08 g/cm$^3$ and $\Delta\chi=-4\times10^{-6}$ and $-5\times10^{-6}$ are used as estimation values $\Delta\rho$ and $\Delta\chi$ at initial and last stages in case (a) of z>0, respectively, and $\Delta\rho=-0.24$ g/cm$^3$ and $-0.17$ g/cm$^3$ and $\Delta\chi=-414\times10^{-6}$ and $-415\times10^{-6}$ are used as estimation values $\Delta\rho$ and $\Delta\chi$ at initial and last stages in case (b) of z<0, respectively, the case (b) shows a stable minimum value over a whole of polymerization process.
Figure 2:
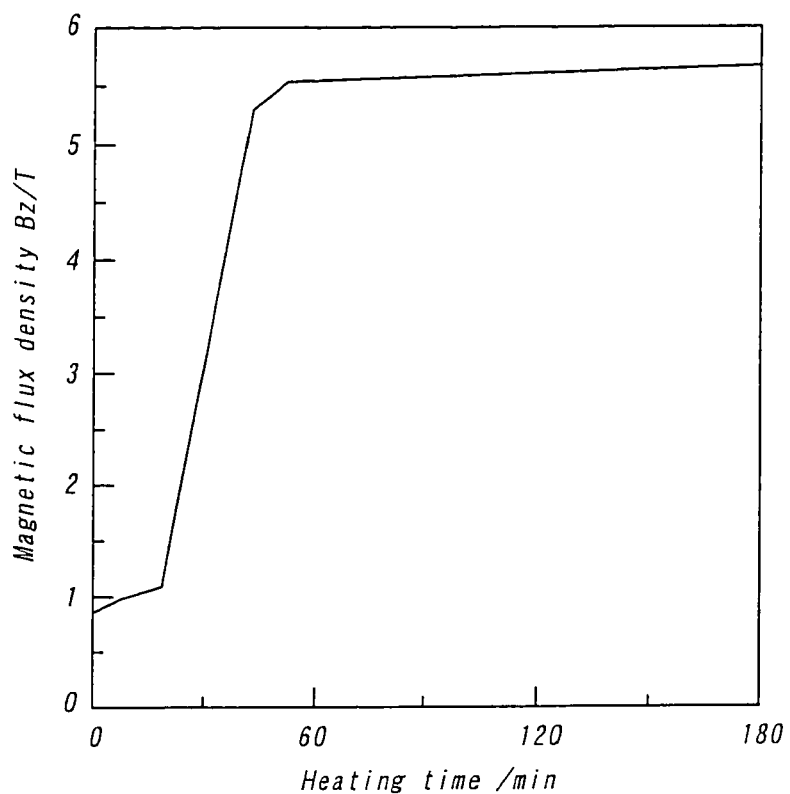
FIG. 2 is a graph showing a central magnetic field intensity with respect to time when the floating is conducted at an upward side from a center of magnetic field in Example 1.
Figure 3:
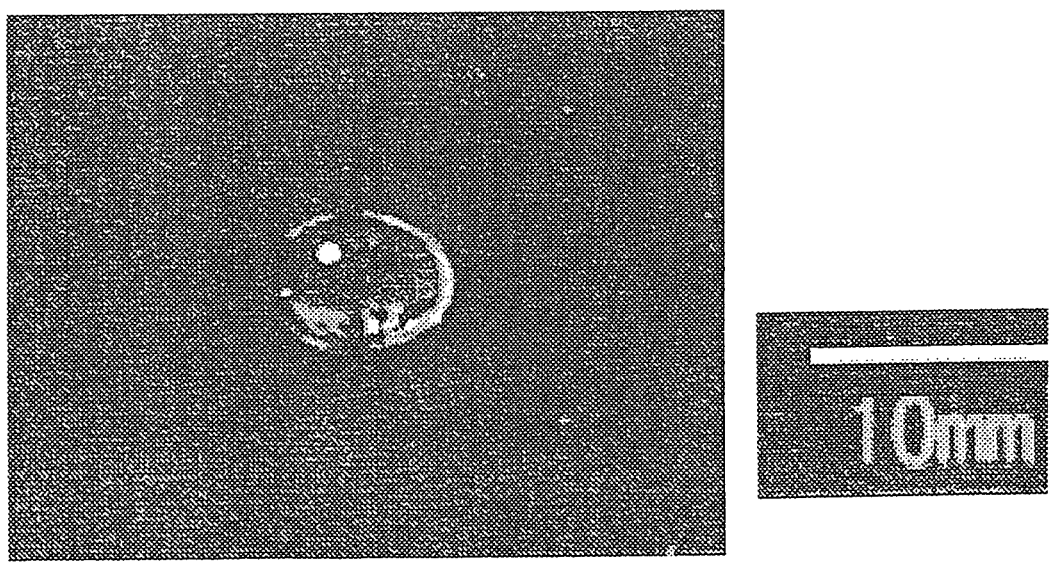
FIG. 3 is a photograph of a spherical body obtained in Example 1.

An aqueous solution of 0.1M manganese chloride is used as a paramagnetic aqueous solution, and benzyl methacrylate (1.040 g/cm$^3$) is used as a monomer, and 0.7 wt % of benzoyl peroxide is added as a polymerization initiator. In this system, since both $\Delta\rho$ and $\Delta\chi$ are very small values, a minimum value can not be substantially recognized in the drawing (FIG. 1a). In fact, droplets of the monomer are not fixed at a stable position in the supporting liquid in an initial polymerization, so that they are sometimes agitated with a glass rod to proceed polymerization while preventing the contact with a vessel wall. A heating time is 3 hours. The monomer is floated in a minimum energy value of FIG. 1a (z>0, upward side from a center of magnetic field). As the polymerization proceeds through the heating, the magnetic susceptibility and density are changed and droplets of the monomer start to settle, and a central magnetic field intensity is controlled as shown in FIG. 2 so as to float the droplets in a proper position. As a result of changing the magnetic field intensity, a valley of a minimum value becomes deep, but the position of the valley comes out of a solenoid (z is more than about 11 cm), so that a stability in a horizontal direction is lost. Although a spherical body is obtained, it is far from a true-sphere (Table 1), which is considered due to the fact that the position at the initial state is a unstable position. A photograph of the resulting spherical body is shown in FIG. 3.

TABLE 1

| Polymer spherical body | Particle size (mm) | Tolerance |
| --- | --- | --- |
| 1 | 8.991 | +/−2.160 |
| 2 | 7.227 | +/10.658 |

EXAMPLE 2

Case of floating downward side from a center of magnetic field ($\Delta\rho<0$, z<0)

Figure 1B:
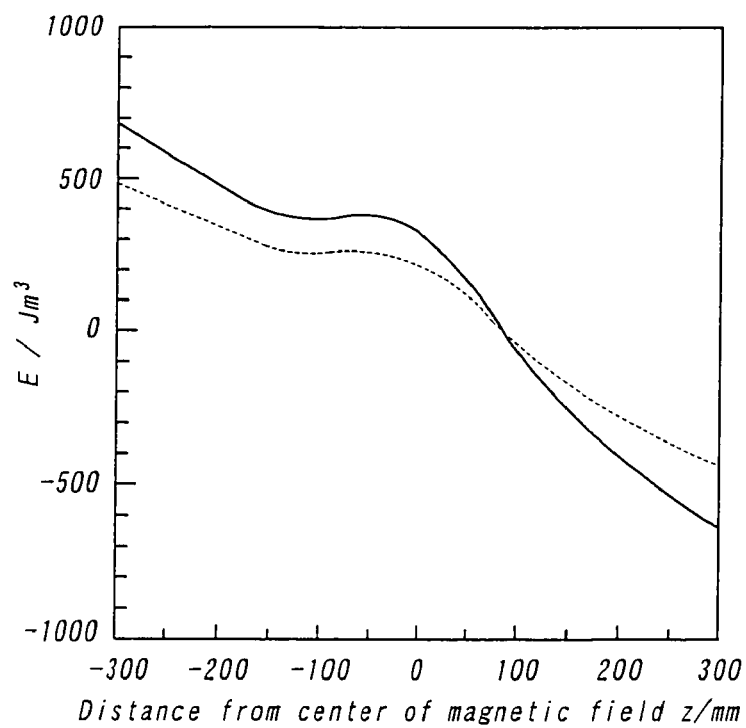

By increasing the concentration of the aqueous solution of manganese chloride used as the paramagnetic aqueous solution in Example 1 to 2M and applying the magnetic field is floated the monomer at a downward side from the center of the magnetic field. In this case, the monomer floats in a minimum energy value of FIG. 1b (initial polymerization). As the monomer is used benzyl methacrylate (1.040 g/cm$^3$) and 0.7 wt % of benzoyl peroxide is added as a polymerization initiator. The polymerization temperature is 70° C., and the heating time is 4 hours, and the magnetic field applied is first 1.3 T (at the center of the magnetic field). As a result of controlling a central magnetic field intensity in conformity with the progress of the polymerization, there are obtained polymer true-spheres. When the monomer is poured, the central magnetic field intensity is 1.3 T and the floating position is z=−60 to −80 mm, while after the heating of 4 hours, the central magnetic field intensity is 0.9 T and the floating position is z=−80 to −100 mm.

Figure 4:
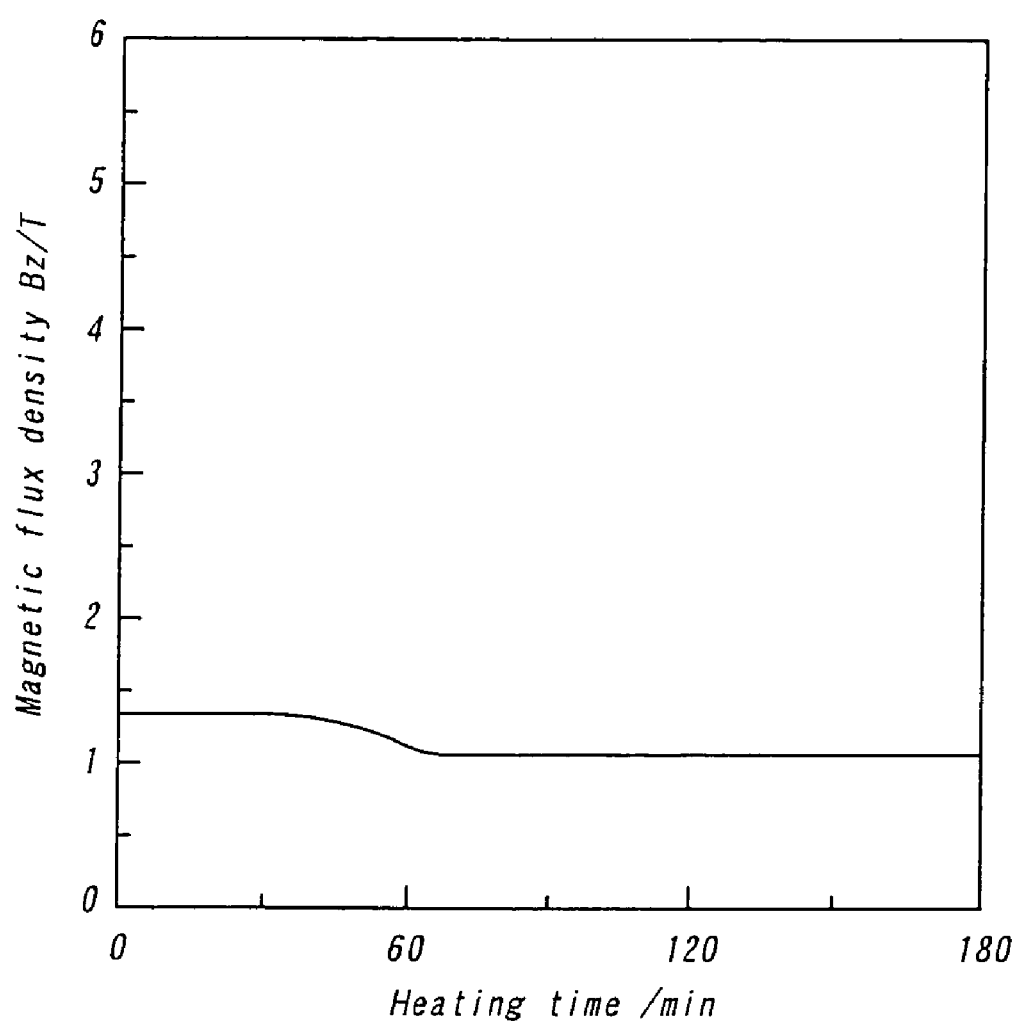
FIG. 4 is a graph showing a central magnetic field intensity with respect to time when the floating is conducted at a downward side from a center of magnetic field in Example 2.

With the progress of the polymerization, the central magnetic field intensity is temporally changed as shown in FIG. 4. If the polymerization temperature and the density of the supporting liquid are the same, similar behavior is brought irrespectively of the size of the monomer droplet.

Figure 5:
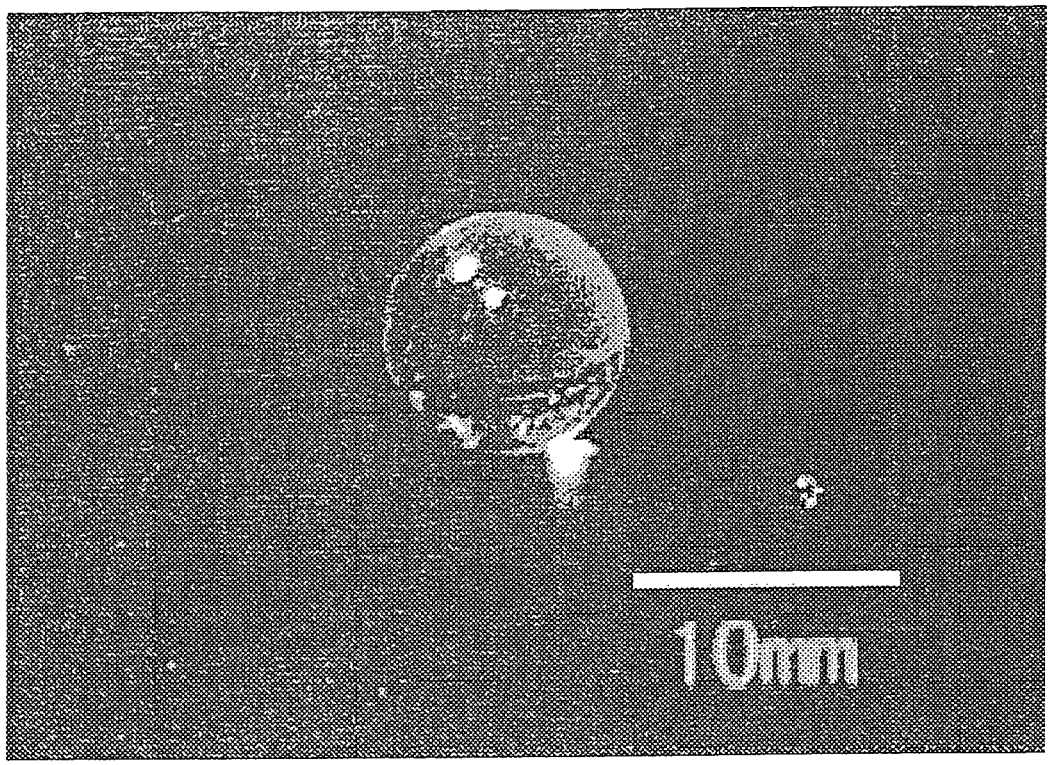
FIG. 5 is a photograph of a true-sphere obtained in Example 2.
Figure 6:
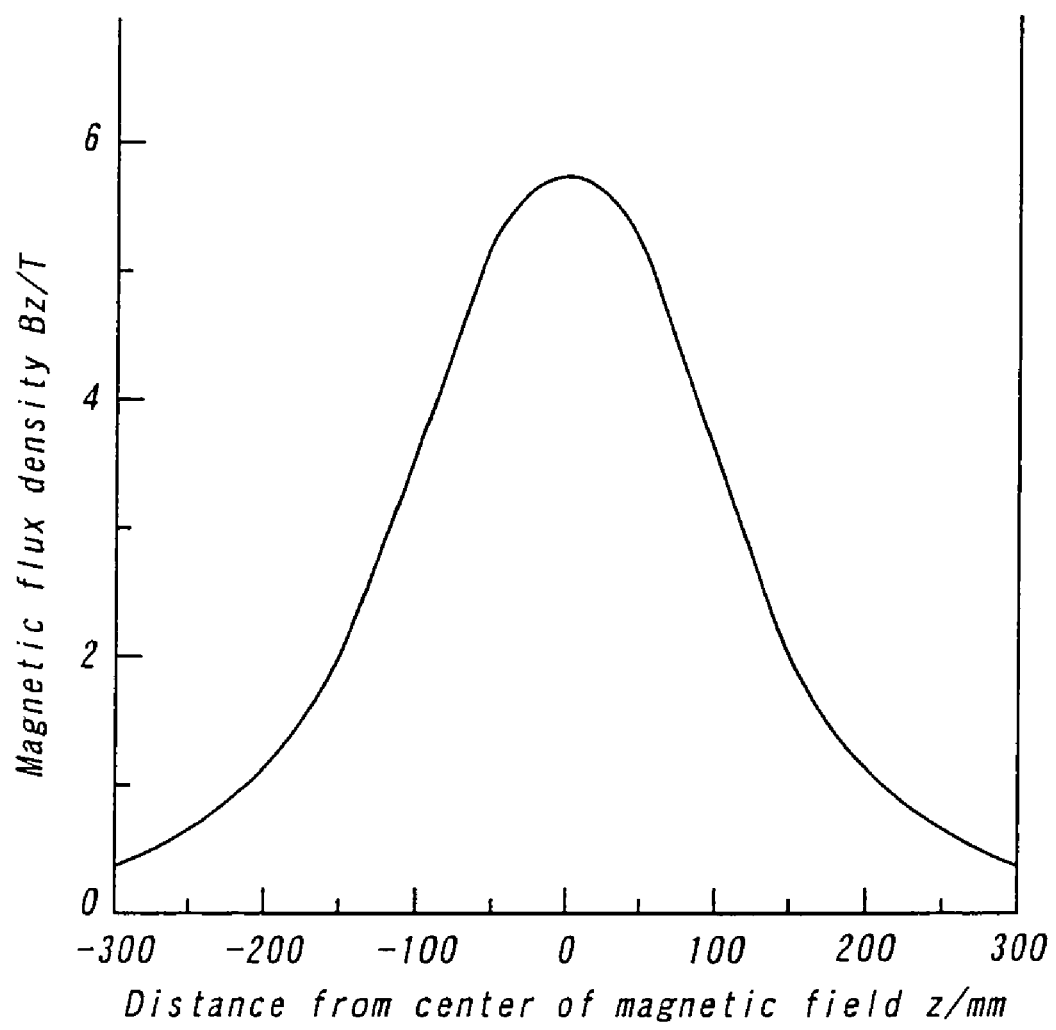
FIG. 6 shows a distribution of a magnetic field intensity in a magnet used, in which a magnetic field intensity B at each z changes in proportion to a central magnetic field intensity.

Polymer true-spheres having different sizes are obtained by changing the amount of the monomer. As an example, outer diameters and tolerances of four polymer true-spheres are shown in Table 2. A photograph of the true-sphere is shown in FIG. 5.

TABLE 2

| Polymer true-sphere | Particle size (mm) | Tolerance |
| --- | --- | --- |
| 1 | 6.212 | +/−0.026 |
| 2 | 6.454 | +/−0.046 |
| 3 | 7.899 | +/−0.044 |
| 4 | 8.894 | +/−0.074 |

COMPARATIVE EXAMPLE 1

Preparation of polymer true-sphere through suspension polymerization

Benzyl methacrylate added with 0.7 wt % of benzoyl chloride as a polymerization initiator is dispersed in an aqueous solution of 0.1M manganese chloride as a supporting liquid with agitation. By polymerizing at a polymerization temperature of 70° C. for 3 hours are obtained polymer true-spheres having various sizes. However, the size of the resulting true-sphere is as small as about 1 mm at maximum.

COMPARATIVE EXAMPLE 2

Preparation of polymer true-sphere by adjustment of density

In an aqueous solution of manganese chloride having a density adjusted to be equal to that of the monomer used in Comparative Example 1 are floated droplets of the monomer, which are polymerized under the same condition as mentioned above. With the progress of the polymerization is changed the density of the monomer, so that spheres of the monomer are settled and hence the polymer true-sphere is not obtained.

INDUSTRIAL APPLICABILITY

The production method of the polymer spherical body according to the invention can produce polymer spherical bodies having no problem on accuracy of true-sphere nor problem of residual strain through compression stress and solidification stress and is suitable for the production of polymer spherical bodies utilized for optical lens and the like.

The invention claimed is:

1. A method of producing a polymer spherical body, which comprises suspending a liquid monomer in a supporting liquid having a magnetic susceptibility $\chi_2$ larger than a magnetic susceptibility $\chi_1$ of any one of the liquid monomer, monomer in the course of the polymerization, the resulting polymer and polymer mixture and not dissolving substantially the monomer, and applying a gradient magnetic field to the supporting liquid to float droplets of the monomer at a given position in the supporting liquid, and polymerizing and solidifying the droplets while maintaining a state that the droplet is substantially shaped into a sphere through surface tension.

2. The method according to claim 1, wherein the polymerization is carried out while adjusting a degree of the gradient of the magnetic field so that the droplets of the monomer always retains at a given position in the supporting liquid in conformity with changes of density and magnetic susceptibility of the droplet with the progress of the polymerization until the polymerization is sufficiently progressed and the solidification is completed.

3. The method according to claim 2, wherein heat reaction or light reaction is used in the polymerization.

4. The method according to claim 3, wherein the monomer is a diamagnetism ($\chi_1<0$) and the supporting liquid is an aqueous solution of a paramagnetic inorganic salt ($\chi_2>0$).

5. The method according to claim 4, wherein the supporting liquid is an aqueous solution of a paramagnetic inorganic salt selected from the group consisting of manganese chloride, manganese sulfate, iron chloride, iron sulfate and gadolinium chloride.

6. The method according to claim 5, wherein the monomer is a water-insoluble organic monomer having a vinyl bond selected from the group consisting of methyl methacrylate, benzyl methacrylate and styrene.

7. The method according to claim 1, wherein heat reaction or light reaction is used in the polymerization.

8. The method according to claim 7, wherein the monomer is a diamagnetism ($\chi_1<0$) and the supporting liquid is an aqueous solution of a paramagnetic inorganic salt ($\chi_2>0$).

9. The method according to claim 2, wherein the monomer is a diamagnetism ($\chi_1<0$) and the supporting liquid is an aqueous solution of a paramagnetic inorganic salt ($\chi_2>0$).

10. The method according to claim 1, wherein the monomer is a diamagnetism ($\chi_1<0$) and the supporting liquid is an aqueous solution of a paramagnetic inorganic salt ($\chi_2>0$).

11. The method according to claim 8, wherein the supporting liquid is an aqueous solution of a paramagnetic inorganic salt selected from the group consisting of manganese chloride, manganese sulfate, iron chloride, iron sulfate and gadolinium chloride.

12. The method according to claim 9, wherein the supporting liquid is an aqueous solution of a paramagnetic inorganic salt selected from the group consisting of manganese chloride, manganese sulfate, iron chloride, iron sulfate and gadolinium chloride.

13. The method according to claim 10, wherein the supporting liquid is an aqueous solution of a paramagnetic inorganic salt selected from the group consisting of manganese chloride, manganese sulfate, iron chloride, iron sulfate and gadolinium chloride.

14. The method according to claim 1, wherein the monomer is a water-insoluble organic monomer having a vinyl bond selected from the group consisting of methyl methacrylate, benzyl methacrylate and styrene.

15. The method according to claim 2, wherein the monomer is a water-insoluble organic monomer having a vinyl bond selected from the group consisting of methyl methacrylate, benzyl methacrylate and styrene.

16. The method according to claim 3, wherein the monomer is a water-insoluble organic monomer having a vinyl bond selected from the group consisting of methyl methacrylate, benzyl methacrylate and styrene.

17. The method according to claim 4, wherein the monomer is a water-insoluble organic monomer having a vinyl bond selected from the group consisting of methyl methacrylate, benzyl methacrylate and styrene.

18. The method according to claim 7, wherein the monomer is a water-insoluble organic monomer having a vinyl bond selected from the group consisting of methyl methacrylate, benzyl methacrylate and styrene.

19. The method according to claim 8, wherein the monomer is a water-insoluble organic monomer having a vinyl bond selected from the group consisting of methyl methacrylate, benzyl methacrylate and styrene.

20. The method according to claim 9, wherein the monomer is a water-insoluble organic monomer having a vinyl bond selected from the group consisting of methyl methacrylate, benzyl methacrylate and styrene.

21. The method according to claim 10, wherein the monomer is a water-insoluble organic monomer having a vinyl bond selected from the group consisting of methyl methacrylate, benzyl methacrylate and styrene.

22. The method according to claim 11 wherein the monomer is a water-insoluble organic monomer having a vinyl bond selected from the group consisting of methyl methacrylate, benzyl methacrylate and styrene.

23. The method according to claim 12, wherein the monomer is a water-insoluble organic monomer having a vinyl bond selected from the group consisting of methyl methacrylate, benzyl methacrylate and styrene.

24. The method according to claim 13, wherein the monomer is a water-insoluble organic monomer having a vinyl bond selected from the group consisting of methyl methacrylate, benzyl methacrylate and styrene.

* * * * *